(12) United States Patent
Aylett

(10) Patent No.: US 6,981,715 B1
(45) Date of Patent: Jan. 3, 2006

(54) SLIDING HITCH

(76) Inventor: Robert C. Aylett, 1815 Boston Dr., Las Cruces, NM (US) 88001

( * ) Notice: Subject to any disclaimer, the term of this patent is extended or adjusted under 35 U.S.C. 154(b) by 72 days.

(21) Appl. No.: 10/754,329

(22) Filed: Jan. 9, 2004

(51) Int. Cl.
*B62D 53/08* (2006.01)

(52) U.S. Cl. .................... 280/441; 280/439; 280/438.1

(58) Field of Classification Search ................ 280/433, 280/438.1, 439, 400, 441, 425.1, 496, 497, 280/498, 901
See application file for complete search history.

(56) References Cited

U.S. PATENT DOCUMENTS

| | | | | |
|---|---|---|---|---|
| 1,334,113 | A | * | 3/1920 | Norton ........................ 280/441 |
| 2,093,761 | A | * | 9/1937 | Kramer ....................... 280/441 |
| 2,391,372 | A | * | 12/1945 | Weigand ................... 280/438.1 |
| 3,092,399 | A | * | 6/1963 | Hair ........................ 280/438.1 |
| 3,527,476 | A | | 9/1970 | Winckler |
| 3,729,214 | A | | 4/1973 | Mulcahy et al. |
| 3,790,188 | A | | 2/1974 | Johannes |
| 3,801,138 | A | * | 4/1974 | Quick ...................... 280/478.1 |
| 3,810,663 | A | * | 5/1974 | Berends .................... 280/425.1 |
| 3,955,831 | A | | 5/1976 | Whitchurch |
| 4,546,994 | A | | 10/1985 | Taylor |
| 4,614,355 | A | | 9/1986 | Koch |
| 4,991,864 | A | * | 2/1991 | Potsch ........................ 280/441 |
| 5,472,222 | A | | 12/1995 | Marcy |
| 5,772,229 | A | | 6/1998 | Cattau |
| 5,964,476 | A | * | 10/1999 | Maines ....................... 280/433 |
| 6,170,849 | B1 | * | 1/2001 | McCall ...................... 280/433 |
| 6,474,674 | B2 | * | 11/2002 | Piercey, III ................. 280/441 |
| 6,581,951 | B2 | * | 6/2003 | Lange ........................ 280/440 |
| 6,692,013 | B1 | * | 2/2004 | Zebolsky et al. ........... 280/439 |

* cited by examiner

*Primary Examiner*—Lesley D. Morris
*Assistant Examiner*—Daniel Yeagley

(57) ABSTRACT

A sliding hitch for receiving a trailer includes a rectangular base member having opposed end portions attachable to a bed of a truck. The sliding hitch further includes a plurality of stationary members aligned with each other. One of the plurality of stationary members has a groove formed therein extending substantially parallel to a longitudinal axis. A plurality of helical spring members are disposed adjacent the opposed end portions of the base member respectively. The sliding hitch further includes a hitch member having a lower portion and an upper portion having a substantially spherical shape integral with the lower portion and extending upwardly therefrom. The plurality of spring members allow the hitch member to slide forwardly and rearwardly to thereby reduce forces exerted on a truck and a trailer during operating conditions.

3 Claims, 3 Drawing Sheets

SLIDING HITCH

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

Technical Field

This invention relates to trailer hitches and, more particularly, to a sliding hitch for fifth wheel trailers.

Prior Art

In contrast with the present invention, a simple, common type of trailer hitch consists of a rigid tongue centered along the longitudinal axis of a trailer and cantilevered forwardly from the trailer to a pivot connection at the rear end of a vehicle, hereinafter referred to as a truck. This pivot connection, a pin or a ball, secures the tongue to the truck but provides a lateral swinging freedom of movement between the truck and the trailer when the truck is turning.

This conventional trailer hitch has several disadvantages. In the first place, a trailer will often sway from one side to the other while it is being towed, as by a truck, and occasionally this swaying can be severe and extremely hazardous. Also, the trailer will not always properly follow when the truck is turning. Also, a truck and a trailer are very difficult to steer during backing operations. The disadvantages above noted reside primarily in the fact that the tongue of the trailer is connected to the rear end of the truck, usually adjacent to the rear bumper and this connection is several feet behind the rear wheels of the truck. Thus, whenever the vehicle commences to turn in one direction, the first movement at the rear end of the truck is in the opposite direction because, in a relative sense, the vehicle will pivot at its rear axle. This produces, first, a lateral movement away from the turn, and such a movement may be magnified when transmitted to the tongue of the trailer. Swaying of the trailer can thus occur when a truck is driving down a road where the operator has to make minor steering corrections. Each time the operator makes a slight turn to the right or left, the first response by the trailer will be a slight turn in the opposite direction. The trailer will then swing back and overcompensate such movement to produce the resulting side sway in a trailer. The same type of overcompensation occurs when the trailer is being backed up and the operator must learn to control steering movements in the truck that are the opposite from that which would appear to be normal to him.

In commercial tractor-trailer rigs, this problem is obviated by the use of a fifth wheel at the front end of the trailer. This fifth wheel, the pivot connection, is over the rear wheel assembly of the tractor so that the turning of the tractor does not create any significant lateral movement of the trailer. The advantage of such an arrangement has been recognized in small trailers that are towed by pickup trucks, because the trailers for pickup trucks are now being provided with gooseneck connections, a forwardly extended arm which carries an overhanging, forwardly extended connection to produce an equivalent to the fifth wheel. This gooseneck connection connects with a base pad in the bed of the pickup truck directly over the rear axle. The same comparable result is attempted for connecting a trailer to automobiles by using a special tongue connector that extends underneath the rear of the automobile to the rear axle where it is pivoted.

Unfortunately, the conventional gooseneck connectors are not entirely satisfactory. They do transfer a portion of the load on a trailer directly over the drive wheels of a truck, which is desirable, but whenever the truck is pulling a load, the connector on the deck of the pickup truck creates an undesirable torque action tending to lift the steering wheels of the truck and placing excessive stress on the base pad and connector. This causes bucking and sudden forces to be transmitted through the truck cab, resulting in a rough and uncomfortable ride. In addition, this stress can lead to metal fatigue in the base pad and connector.

Accordingly, there is a need for an improved mode of connecting a trailer to a vehicle that will avoid the disadvantages above noted.

BRIEF SUMMARY OF THE INVENTION

In view of the foregoing background, it is therefore an object of the present invention to provide a device for absorbing the excessive forces exerted on a sliding hitch including a ball or a fifth wheel trailer hitch. These and other objects, features, and advantages of the invention are provided by a sliding hitch for receiving a trailer and including a rectangular base member attachable to a bed of a truck. Such a base member has a substantially planar top surface, opposed end portions, and a centrally disposed longitudinal axis.

The sliding hitch further includes a plurality of central members disposed substantially medially between the opposed end portions. One of the plurality of central members is securely fastened to the base member and has a groove extending substantially parallel to the axis. Another of the plurality of central members has a lower portion disposed below the groove and includes a hitch member extending upwardly from the lower portion for receiving a trailer. The upper portion of the hitch member has a substantially spherical shape.

The sliding hitch further includes a plurality of support rods extending through another central member and substantially parallel to the axis. The plurality of support rods have opposed end portions extending outwardly and away from another central member and stopping inwardly from the opposed end portions of the base member and secured thereto. A plurality of helical spring members are positioned about the plurality of rods, respectively, and are spaced along the top surface of the base member and disposed adjacent the opposed end portions thereof, respectively.

The sliding hitch further includes a shock member that includes a plurality of brackets for connecting same to the base member and another central member. The shock member absorbs the energy of sudden stresses exerted on the hitch member. The plurality of spring members contact another ventral member and cooperate with the shock member for providing a resistive force. This allows the hitch member to slide forwardly and rearwardly along the groove and thereby reduce the operating stresses exerted on a truck and a trailer.

In an alternate embodiment, the sliding hitch includes a frame having front and rear portions and a base member securable to a select portion of a truck. A plurality of primary support members extend upwardly therefrom.

The sliding hitch further includes a hitch member pivotally connected to one of the plurality of primary support members and disposed generally medially of the front and rear end portions. The hitch member is pivotable along a first plane to thereby oscillate during operating conditions. One primary support member is pivotally connected to the base member and is movable about the first plane.

The sliding hitch further includes a plurality of secondary support members having opposed end portions selectively connected to the plurality of primary support members respectively for assisting to maintain same at a substantially stable position. Select ones of the plurality of secondary support members overlap each other adjacent a corresponding one of the plurality of primary support members. A plurality of spacers are disposed beneath the hitch member and are secured to one primary support member.

The sliding hitch further includes a plurality of shock members having opposed end portions connected to the frame and the plurality of spacers respectively for absorbing the energy of sudden stresses exerted on a truck during operating conditions. The plurality of shock members are disposed at approximately 45 degrees to a bed of a truck.

The sliding hitch further includes a plurality of spring members extending substantially parallel to the base member and secured to the plurality of spacers and the frame. The plurality of spring members are compressible for cooperating with the plurality of shock members to thereby absorb forward and rearward forces and reduce stress exerted on a truck and a trailer during operating conditions.

The sliding hitch further includes a hitch member having a lower portion and an upper portion having a substantially spherical shape integral with the lower portion and extending upwardly therefrom. The plurality of spring members contact the plurality of stationary members and allow the hitch member to slide forwardly and rearwardly to thereby reduce forces exerted on a truck and a trailer during operating conditions.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
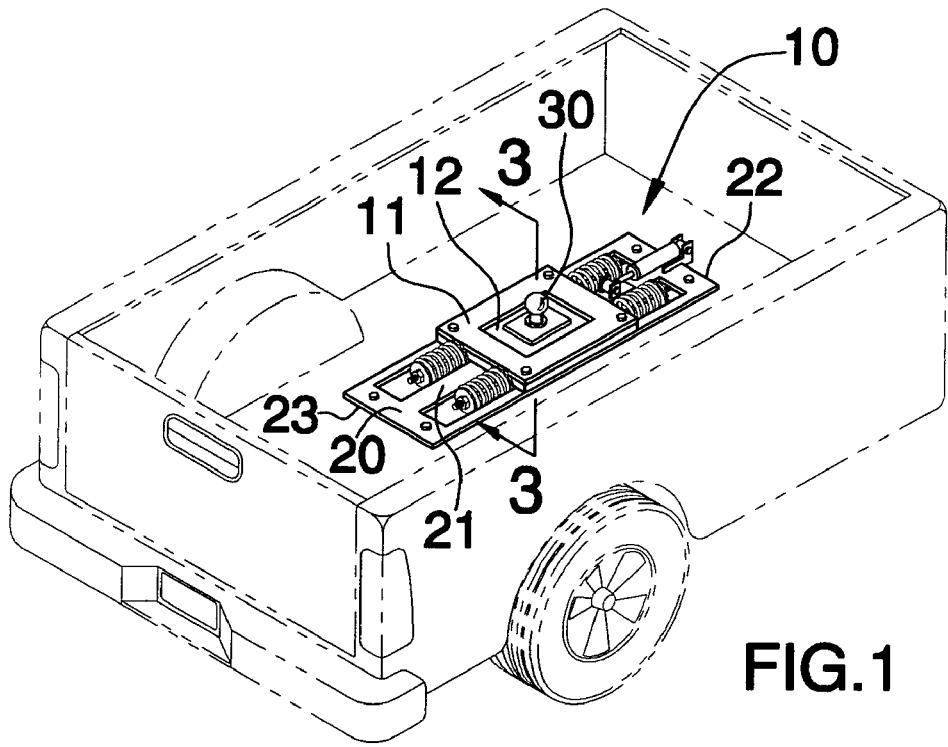
FIG. 1 is a perspective view showing a sliding hitch in a preferred embodiment, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout and prime and double prime numbers refer to alternate embodiments of such elements.

The device of this invention is referred to generally in FIGS. 1–6 by the reference numeral 10 and is intended to provide a sliding hitch for absorbing the excessive forces exerted on fifth wheel trailers. It should be understood that the sliding hitch 10 may be used with many different sized trailers.

Figure 2:
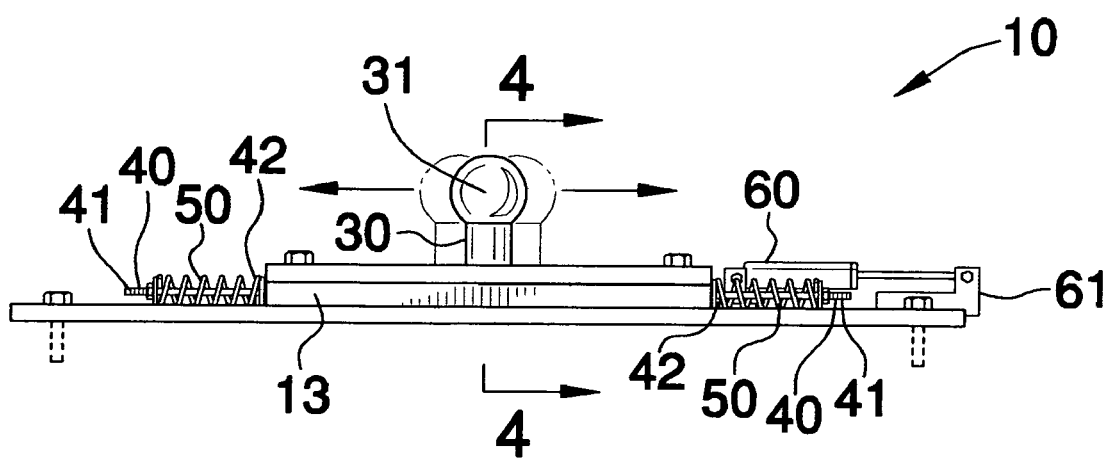
FIG. 2 is a side elevational view of the sliding hitch shown in FIG. 1 and showing the sliding action.

Referring initially to FIGS. 1 and 2, the sliding hitch 10 includes a rectangular base member 20 attachable to a bed of a truck. Such a base member 20 has a substantially planar top surface 21, opposed end portions 22, 23, and a centrally disposed longitudinal axis (not shown).

The sliding hitch 10 further includes a plurality of central members 11 disposed substantially medially between the opposed end portions 22, 23. One of the plurality of central members 11 is securely fastened to the base member 20 and has a groove 12 extending substantially parallel to the axis. Another of the plurality of central members 11 has a lower portion disposed 13 below the groove 12 and includes a hitch member 30 extending upwardly from the lower portion 13 for receiving a trailer. The upper portion 31 of the hitch member 30 has a substantially spherical shape but may also include other suitable shapes well-known in the industry.

Figure 3:
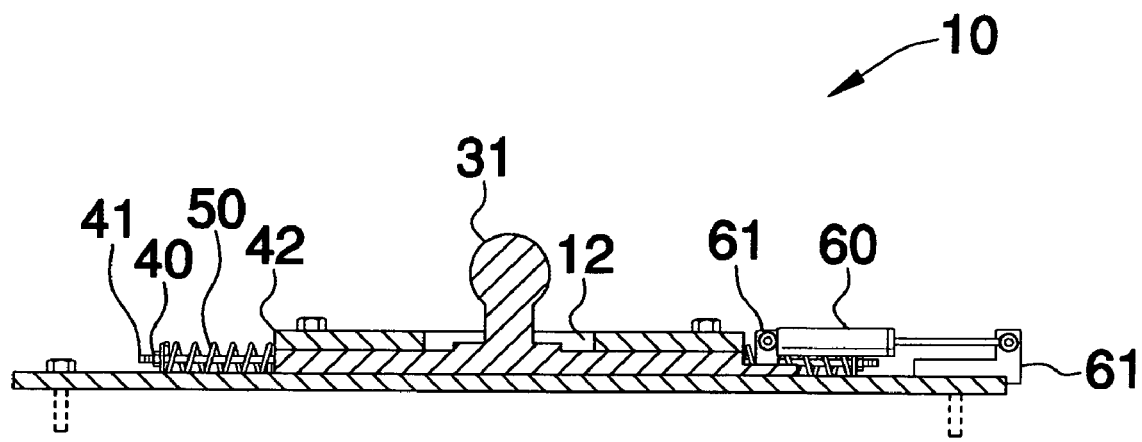
FIG. 3 is a cross-sectional view of the sliding hitch shown in FIG. 1 taken along line 3—3.
Figure 4:
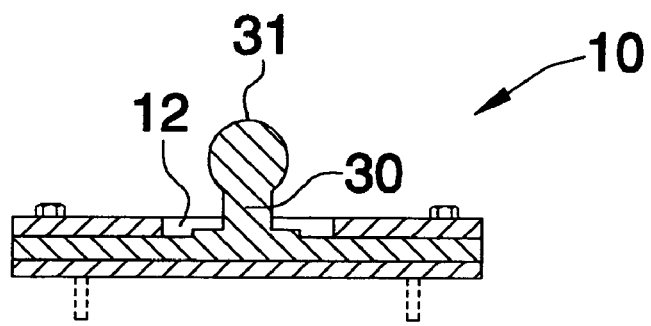
FIG. 4 is a cross-sectional view of the sliding hitch shown in FIG. 2 taken along line 4—4.

Now referring to FIGS. 3 and 4, the sliding hitch 10 further includes a plurality of support rods 40 extending through central member 11 and disposed substantially parallel to the axis. The plurality of support rods 40 have opposed end portions 41, 42 extending outwardly and away from central member 11 and stopping inwardly from the opposed end portions 22, 23 of the base member 20 and secured thereto. A plurality of helical spring members 50 are positioned about the plurality of rods 40, respectively, and are spaced along the top surface of the base member 20 and disposed adjacent the opposed end portions 22, 23 thereof, respectively.

The sliding hitch 10 further includes a shock member 60 that includes a plurality of brackets 61 for connecting same to the base member 20 and central member 11. The shock member 60 absorbs the energy of sudden stresses exerted on the hitch member 30. The plurality of spring members 50 contact central member 11 and cooperate with the shock member 60 for providing a resistive force. This allows the hitch member 20 to slide forwardly and rearwardly along the groove 12 and thereby reduce the operating stresses exerted on a truck and a trailer.

Figure 5:
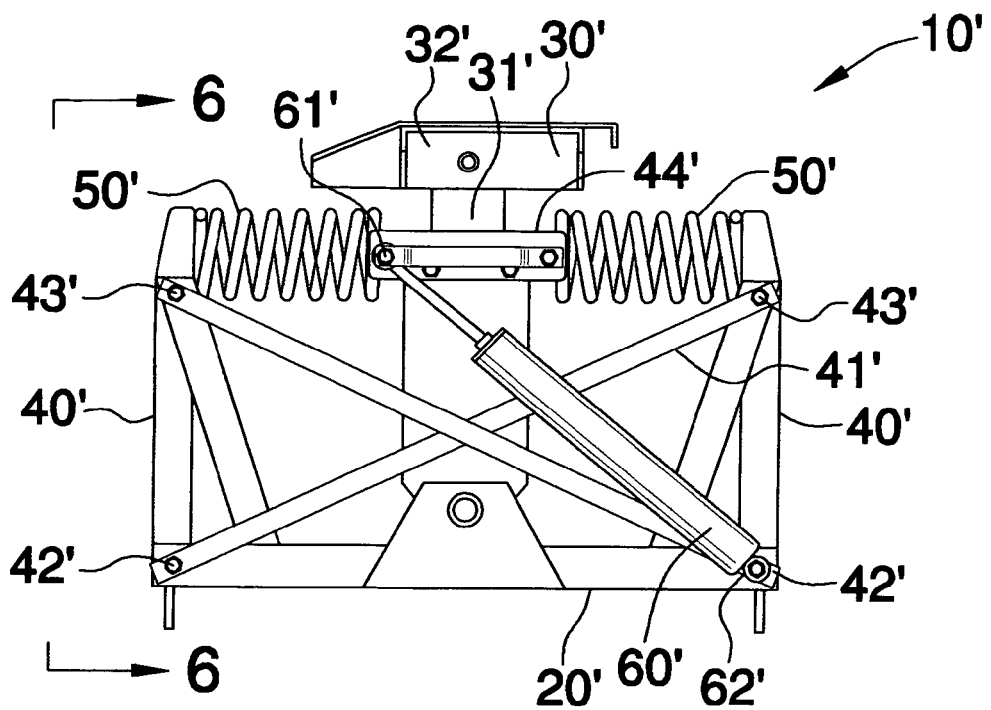
FIG. 5 is a side elevational view showing an alternate embodiment of the present invention.
Figure 6:
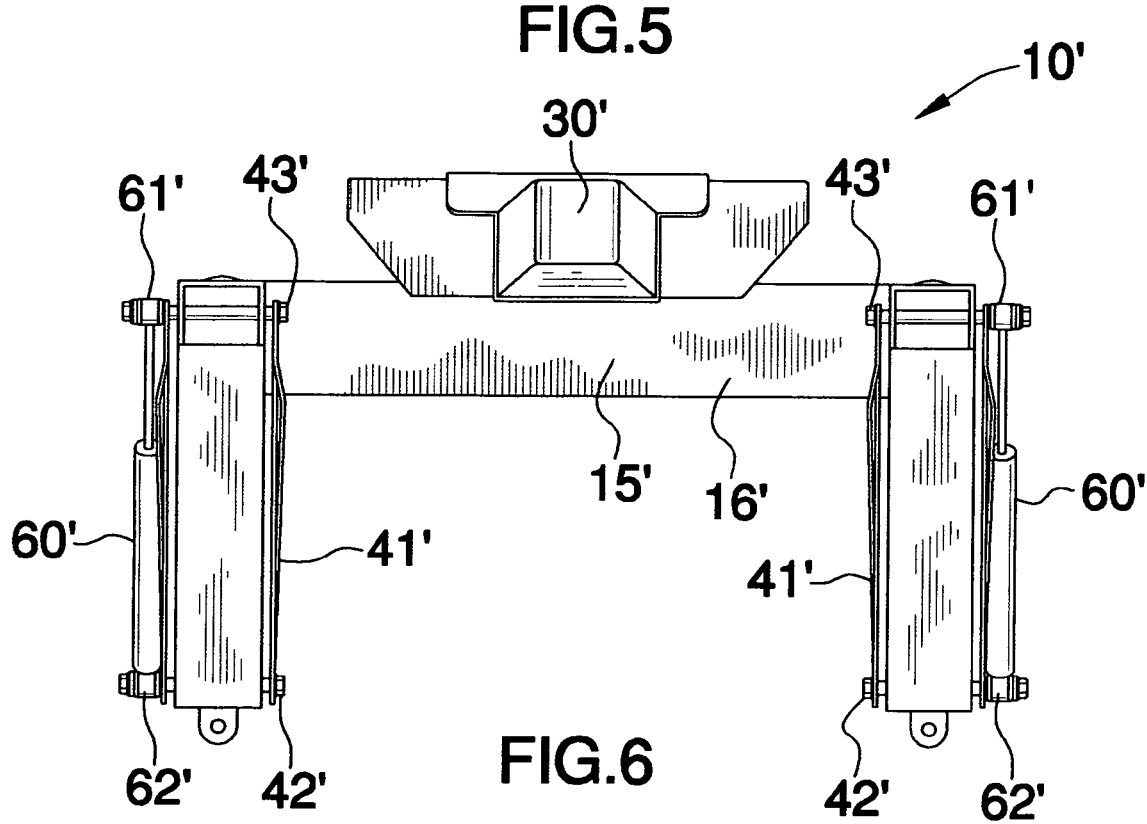
FIG. 6 is a front elevational view of FIG. 5.

Now referring to FIGS. 5 and 6, in an alternate embodiment, the sliding hitch 10' includes a frame 15' having front 16' and rear 17' portions and a base member 20' and being securable to a select portion of a truck. A plurality of primary support members 40' extend upwardly therefrom.

The sliding hitch 10' further includes a hitch member 30' pivotally connected to one of the plurality of primary support members 40' and disposed generally medially of the front 16' and rear 17' end portions. The hitch member 30' is pivotable along a first plane to thereby oscillate during operating conditions. One primary support member 40' is pivotally connected to the base member 20' and is movable about the first plane.

The sliding hitch 10' further includes a plurality of secondary support members 41' having opposed end portions 42', 43' selectively connected to the plurality of primary support members 40' respectively for assisting to maintain same at a substantially stable position. Select ones of the plurality of secondary support members 41' overlap each other adjacent a corresponding one of the plurality of primary support members 40'. A plurality of spacers 44' are disposed beneath the hitch member 20' and secured to one primary support member 40'.

The sliding hitch 10' further includes a plurality of shock members 60' having opposed end portions 61', 62' connected to the frame 15' and the plurality of spacers 44' respectively, for absorbing the energy of sudden stresses exerted on a truck during operating conditions. The plurality of shock members 60' are disposed at approximately 45 degrees to a bed of a truck.

The sliding hitch 10' further includes a plurality of spring members 50' extending substantially parallel to the base member 20' and secured to the plurality of spacers 44' and the frame 15'. The plurality of spring members 50' are compressible for cooperating with the plurality of shock members 60' to thereby absorb forward and rearward forces and thereby reduce the stress exerted on a truck and a trailer during operating conditions.

The hitch member 30' has a lower portion 31' and further includes an upper portion 32' having a substantially spherical shape integral with the lower portion 31' and extending upwardly therefrom. The plurality of spring members 50' contact the plurality of support members 40' and allow the hitch member 30' to slide forwardly and rearwardly along the groove 12' to thereby reduce forces exerted on a truck and a trailer during operating conditions.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A sliding hitch for receiving a trailer and comprising:
    a frame having front and rear portions and including a base member and a plurality of primary support members extending upwardly therefrom, said frame being securable to a select portion of a truck;
    a hitch member pivotally connected to one said plurality of primary support members and being disposed generally medially of said front and rear end portions, said hitch member being pivotable along a first plane to thereby oscillate during operating conditions, said one primary support member being pivotally connected to said base member and being movable about the first plane;
    a plurality of secondary support members having opposed end portions selectively connected to said plurality of primary support members respectively and for assisting to maintain same at a substantially stable position, select ones of said plurality of secondary support members overlapping each other adjacent a corresponding one of said plurality of primary support members;
    a plurality of spacers disposed beneath said hitch member and secured to said one primary support member;
    a plurality of shock members including opposed end portions connected to said frame and said plurality of spacers respectively, said plurality of shock members for absorbing energy of sudden stresses being exerted on a truck during operating conditions; and
    a plurality of spring members secured to said plurality of spacers and said frame, said plurality of spring members being compressible for cooperating with said plurality of shock members to thereby absorb forward and rearward forces and reduce stress being exerted on a truck and a trailer.

2. The sliding hitch of claim 1, wherein said plurality of shock members are disposed at approximately 45 degrees to a bed of a truck.

3. The sliding hitch of claim 1, wherein said plurality of spring members extend substantially parallel to said base member.

\* \* \* \* \*